United States Patent
Jenkins et al.

(10) Patent No.: US 6,668,318 B1
(45) Date of Patent: Dec. 23, 2003

(54) SYSTEM AND METHOD FOR LOADING ONE OF A PLURALITY OF OPERATING SYSTEMS AND ADJUSTING THE OPERATING FREQUENCY ACCORDINGLY USING TRANSFERABLE CORE COMPUTER THAT RECOGNIZES A SYSTEM ENVIRONMENT

(75) Inventors: Michael D. Jenkins, Burke, VA (US); John F. Moynahan, Fairfax, VA (US)

(73) Assignee: Xybernaut Corp., Fairfax, VA (US)

( * ) Notice: Subject to any disclaimer, the term of this patent is extended or adjusted under 35 U.S.C. 154(b) by 598 days.

(21) Appl. No.: 09/583,508

(22) Filed: May 31, 2000

(51) Int. Cl.[7] .................. G06F 15/177; G06F 9/00; G06F 1/26; G06F 1/32
(52) U.S. Cl. .................. 713/1; 713/300; 713/320; 713/322; 713/323
(58) Field of Search .................. 713/600, 601, 713/501, 300, 322, 1, 100, 323, 310, 500, 320; 710/104

(56) References Cited

U.S. PATENT DOCUMENTS

| | | | | |
|---|---|---|---|---|
| 5,560,020 A | * | 9/1996 | Nakatani et al. | 713/322 |
| 5,610,801 A | * | 3/1997 | Begis | 361/784 |
| 5,623,647 A | * | 4/1997 | Maitra | 713/501 |
| 5,760,636 A | * | 6/1998 | Noble et al. | 327/513 |
| 5,764,529 A | * | 6/1998 | Capps et al. | 716/1 |
| 5,781,774 A | * | 7/1998 | Krick | 713/1 |
| 5,862,351 A | * | 1/1999 | He | 710/104 |
| 6,226,741 B1 | * | 5/2001 | Shen et al. | 713/100 |
| 6,367,007 B1 | * | 4/2002 | Do | 713/2 |

FOREIGN PATENT DOCUMENTS

JP    06083476 A  *  3/1994  ............ G06F/1/08

OTHER PUBLICATIONS

Chan, Benson, "BGA Sockets–13 A Dendritic Solution", 1996, IEEE, Electronic Components and Technology Conference. pp 460–466.*

* cited by examiner

*Primary Examiner*—Thomas Lee
*Assistant Examiner*—James K. Trujillo
(74) *Attorney, Agent, or Firm*—James J. Ralabate, Esq.; Christopher M. Tucker

(57) ABSTRACT

In this invention a computer system having a core unit and an enclosure for the core unit is disclosed. The core unit has the ability to determine the nature of the enclosure (be it a car, house, etc.) and to adjust its processor to perform the function required by the enclosure.

13 Claims, 3 Drawing Sheets

SYSTEM AND METHOD FOR LOADING ONE OF A PLURALITY OF OPERATING SYSTEMS AND ADJUSTING THE OPERATING FREQUENCY ACCORDINGLY USING TRANSFERABLE CORE COMPUTER THAT RECOGNIZES A SYSTEM ENVIRONMENT

This invention is related to a transferable and mobile core computer which has a feature allowing the processor of the computer to be clocked down or up within a range of operating frequencies to meet the needs of the application being performed by the enclosure.

BACKGROUND OF THE INVENTION

Modern circuit design techniques have made it possible for computers to become incrementally smaller to the point where a single core module can contain all the system level components of a computer. U.S. Pat. No. 6,029,183 describes such a computer, designated as a transferable core computer. The core computer is an enclosure containing all the internal components of a computer, but devoid of any interface. All communication between the core and enclosures to which it is inserted is facilitated via a single connector which supplies power to the core unit and serves as a data bus between the core and the enclosure. This common connector allows the core computer to be inserted into any one of a host of devices including, but not limited to, mobile computers, laptop computers, wearable computers, automobiles, appliances, electronic devices (cameras, televisions, etc.), alarm systems, building facilities management systems, office equipment such as copiers, facsimile machines, telephones, personal communications devices, and any other suitable enclosures. Until the core is inserted into such an enclosure it does not function as a computer. It has all the hardware comprising a computer but lacks any interface to make it usable by itself. The mated enclosure provides the interface and makes it function as either a general purpose or single purpose computer. The possibilities of this core computer are virtually limitless. However, in order to maximize the utility of the device, it would be desirable to increase or decrease the computing power of the core to meet the needs of the specific application and enclosure. In many instances the application is defined in large part by the enclosure. This will allow the core to allocate only the necessary resources without wasting power or providing unnecessary capability. This is of particular interest to mobile devices which are dependent on batteries for power. Since there is a direct correlation between processing speed and power consumption, it is desirable to use only the minimum processing speed required to robustly run the desired application. The application itself is defined in large part by the enclosure the core is inserted into. Potential enclosure devices for use with the transferable core computer will typically have varied processing speed/power requirements depending on their application. (In this context of this invention, processing power and processing speed are synonymous to the extent that they are both referring to the speed at which the processor operates) A PDA or cellular phone requires less processing power to operate then a laptop, a laptop in turn less then a desktop. As a result, to maximize the functionality of the core computer it would be desirable for it be able to operate at different processor frequencies as dictated by the enclosure and/or application running therein.

Some companies have attempted to solve the problem addressed by this invention. Intel®, which is a registered trademark of Intel Corporation of 2200 Mission College Blvd., Santa Clara, Calif. 95052, for example, has developed a clock down feature in its mobile processor which allows the processor to operate at its highest clock speed when AC power supply is detected. However, when it detects DC power (battery) it will clock down the processor to approximately 400 Mhz. The purpose of this is to maximize battery life assuming that the mobile computer user would be willing to run the processor slightly slower in order to extend the life of the battery. However, this feature is boolean in nature in that it is either in the normal or the DC state, taking no consideration of the nature of the function being performed, only the power source.

Another company, Transmeta®, which is a registered trademark of Transmeta Corporation of 3940 Freedom Circle, Santa Clara, Calif. 95054, has designed a new processor architecture whereby a software morphing layer surrounds a non x86 based hardware engine and converts x86 instructions into the native language of the VLIW (Very Long Instruction Word) hardware engine. Transmeta® utilizes a power management scheme known as LongRun. In a mobile setting, most conventional x86 CPUs regulate their power consumption by rapidly alternating between running the processor at full speed and turning the processor off. Different performance levels can be obtained by varying the on/off ration (the "duty cycle"). However, with this approach, the processor may be shut off just when a time-critical application needs it. The result may be glitches, such as dropped frames during movie playback, that are perceptible to a user. In contrast, the Transmeta® chip can adjust its power consumption without turning itself off. Instead, it adjusts its clock frequency on the fly. It does so quickly, and without requiring an operating system reboot or having to go through a slow sequence of suspending to and restarting from RAM. As a result, software can continuously monitor the demands on the processor and dynamically pick just the right clock speed (and hence power consumption) needed to run the application. The switching happens sufficiently fast to be imperceptible to the user. The software also has the ability to adjust the processor's voltage on the fly because lower voltages can be used to support lower operating frequencies. Since power is the square of voltage this can significantly extend battery life. However, the shortcoming of this system is that it only works on the Transmeta ® processor platform, not existing x86 platforms which dominate the current computer market such as those made by Intel®, AMD®, Cyrix®, and Motorola®. The Transmeta® system will not work for instance with a cellular phone or single-purpose application enclosure whereby a different processing speed or operating system or both is chosen at boot, after the core is inserted in the device, without the aid of the present invention.

Thus there is a need for a system which will work universally with any x86 or other type microprocessor based transferable core computer system which will at boot, adjust the frequency of the processor and load the operating system that is commensurate with the type of enclosure and nature of the application running therein, and which is devoid of any of the disadvantages noted above.

SUMMARY OF THE INVENTION

It is therefore an object of this invention to provide an enhancement to a core computer which overcomes the limitations cited above.

Another object of this invention is to provide a unique micro processor management system.

Still a further object of this invention is to provide a clock down feature for adjusting the system performance of a mobile core computer to the needs of the application and enclosure.

Yet another object of this invention is to provide a system for adapting a processor in a core computer to perform at the optimal speed for the specific enclosure.

Another still further object of the this invention is to provide a system management tool for a core computer which seeks to minimize waste of power when the core computer is running on DC power.

Still yet another object of this invention is to provide an enhancement to a core computer system which at the time of system power on, detects the type of enclosure the core is inserted into and adjusts the system performance accordingly.

These and other objects of this invention are accomplished generally through a mobile and transferable core computer with a clock down feature.

DETAILED DESCRIPTION OF THE INVENTION AND PREFERRED EMBODIMENTS

The disclosed invention overcomes the deficiencies of the prior art through the use of a transferable core computer which incorporates a clock down feature for adjusting the system performance commensurate to the needs of the mated enclosure and operating system/application running therein. This need is communicated by either the enclosure or the core to the other via an electrical connector. This includes clocking down the speed of the microprocessor as well as loading into system memory only the required operating system. The obvious benefits of such a feature are to increase battery life in situations where the enclosure can operate sufficiently at lower speeds without noticeable performance degradation, the ability to operate at optimum speeds where battery life is not a concern (other sources of power are available such as AC or the ability to hot swap batteries), the ability to change the processing speed depending on software or peripheral requirements (eg. Speech vs. keyboard input), the ability to run different OS's or GUIs (graphical user interfaces) depending on what enclosure the core is inserted into, the ability to maximize system performance by not running unnecessary software and finally reducing heat build up associated with the running of the microprocessor. This will be referred to throughout this disclosure and claims as "clock down" or "clock down feature."

This invention relates to a core computer, more specifically an enclosure, where a core computer is inserted into the enclosure, which will adjust the performance of the core computer based on power availability and software requirements as well as the enclosure's intended use. The core computer is a self-contained general purpose computer system that can be inserted into a number of enclosures. This type of core computer is described in U.S. Pat. Nos. 5,999, 952 and 6,029,183. The disclosures of these two patents are hereby incorporated by reference into the present disclosure. It is the enclosure that dictates the features and function set of the computer. Traditionally, computer manufactures have struggled with providing ever increasing performance of processors with the ever increasing requirement for power. As is well understood in the art, there is a direct correlation between processing speed and power consumption. In a desktop environment this is not a limiting issue as there is essentially unlimited power supply through the AC outlet. Thus users always want to maximize processing speed in this environment. However, in a mobile or remote environment where power is limited by battery life it is important to maximize the time of operation of a computer device as well as to provide robust performance. Due to the nature of the enclosure and requirements of said enclosure it may be desirable to trade off some performance to extend battery life. Specifically, in single purpose enclosures, such as communications devices or PDAs, where the enclosure is running a minimal operating system, a fraction of the maximum processing speed of the core computer's processor may be sufficient to achieve robust performance. As a result a significant power savings and extension of battery life will be realized.

This invention will allow an enclosure or alternatively software or embedded instructions in the core to tell the core computer what resources (in terms of processor performance and software) it will require to operate at sufficient performance levels. Since the core computer of this invention will be used in a multitude of enclosures these resources will change from enclosure to enclosure both from a speed requirement as well as a software requirement. This is due to the fact that the software utilized will be dependent upon the features of the enclosure. As an example, the core, in one embodiment may be inserted into a desktop PC enclosure and will be expected to operate at its maximum processing speed and most capable version of operating system. However, if the core is later inserted into a phone enclosure only a fraction of the maximum processing speed will be necessary to achieve satisfactory performance and the operating system will presumably be much simpler then that required by the desktop. Phone functions can be performed sufficiently in the 100 MHz speed range, thus extending the battery life. Because a phone's primary limitation is its battery life, this would be an important feature to extend the functionality of the core unit. Additionally, when the core is powered on and senses that it is in a phone enclosure it will load only the phone's operating system into memory.

It will also be desirable to include a manual override switch so that the user depending up his needs at the time can insure the maximum operating speed of the processor, irregardless of his power limitations. This will cause the core to revert to a default operating mode where maximum system performance and most robust operating system are selected at boot time.

In order to characterize the usefulness of the invention example's embodiments will be provided. In one scenario the user of the core computer inserts it into a cellular telephone enclosure which contains an interface and communication hardware, but lacks a processor. The core unit senses that it is in a cellular phone enclosure which uses a simple operating system and has low processor requirements. Thus functioning at a fractional multiple of the maximum processing speed of the core will be sufficient to achieve robust system performance. As a result battery power will not be wasted by running the processor in the phone at 500 Mhz when running it at ¼ of that would not noticeably affect the performance of the device.

In yet another embodiment the core device maybe inserted into an automobile in order to provide travel related information, internet content, GPS information, etc. In this environment, where the car has a relatively unlimited supply of power it may be desirable to run the processor at a higher clock speed relative to single purpose enclosures. However, at the same time, the user may need less processing power then in a desktop or laptop because only certain specific functions are necessary. That is to say that someone operating a vehicle will presumably not be running rigorous applications while operating the car and thus it might be wasteful of the car's power to run at the highest clock speed since every current drawing device in the car does reduce power available to other electrical devices such as power windows, sunroofs, etc. On the other hand the system needs to be flexible enough to accommodate situations where a passenger may be using the device and have a need for maximum computing power to run more rigorous applications. In this situation the user would select the manual override of the clock down feature. Selection of this override will cause the computer to run at the maximum clock frequency and to load the most capable version of the operating system.

In yet another embodiment such as a laptop computer running on DC power, it may be desirable to reduce the clock speed by 25% in order to gain longer battery life. It also may be desirable in a laptop to always run it at a reduced clock speed to mitigate the heat generated by the processor which can stress other system components. Even though the laptop will run the same operating system as a desktop, users are generally willing to give up some performance relative to desktops to gain mobility and extended battery life. However, when the same core is inserted into a desktop machine or any AC powered control system, machine tool, etc., which has unlimited power supply and adequate heat dissipation, it will be desirable to run at the maximum clock speed running the most rigorous operating system available to the core unit.

In this manner, for each application the fastest necessary clock speed is used without using excessive processing ability at the expensive of reduced battery life. Each application is optimized with respect to the operating system and system performance and the overall flexibility of the core computer unit is maximized through the use of this invention. Additionally, only the required operating system for the specific enclosure is loaded into memory at system boot.

The invention can be reduced to constructive practice through several different embodiments. In one embodiment, an extra pin or connector will be on the core unit itself and a matching receptacle or mating connector will be in the enclosure which will at system boot tell the core what type of device is attached. From this information the core computer will "know" what operating system to load and what operating frequency to set the microprocessor to.

In another embodiment, either the core computer itself, or the enclosure will contain an BIOS chip containing embedded code which either identifies or detects the nature of the enclosure so that the core computer will load the correct operating system and select the appropriate operating frequency for the microprocessor.

In yet another embodiment, the core computer itself will, upon boot, execute a series of system files stored on static memory of said computer, said one of said files causing the computer to execute code which will determine the nature of the enclosure the core is inserted to and load the correct operating system and adjust the system performance to meet the needs of the enclosure and operating system.

As an additional feature to the above embodiments, it may be desirable to allow the user to define the rule set used by the clock down feature of the transferable core computer. This feature is facilitated by including a software application which serves as a management tool for the clock down feature. Such an tool would be run by a computer enclosure with the core unit housed inside. The user would designate for each enclosure, from a viewable list of potential enclosures, the operating system associated with each enclosure from a list of potential operating systems. The user could also specify the operating frequency or fraction of the maximum operating frequency to be used with each device/operating system pair. In the absence of this software management tool the rule set would be hard coded into either the core computer or the device and would not be subject to redefinition.

The foregoing and additional objects and advantages of the invention together with the structure characteristics thereof, Which is only briefly summarized in the foregoing passages, becomes more apparent to those skilled in the art upon reading the detailed description and preferred embodiments, which follow in this specification, taken together with the illustration thereof presented in the representative accompanying drawings.

DETAILED DESCRIPTION OF THE INVENTION AND PREFERRED EMBODIMENTS

Figure 1:
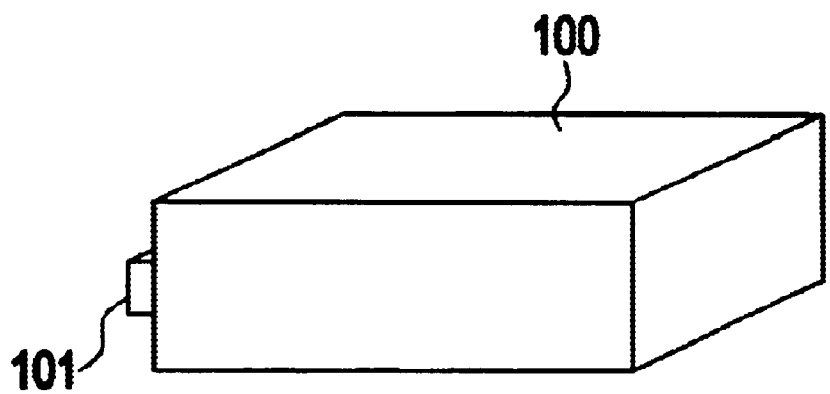
FIG. 1 illustrates a view of the transferable core module used in the system of the present invention.
Figure 1:
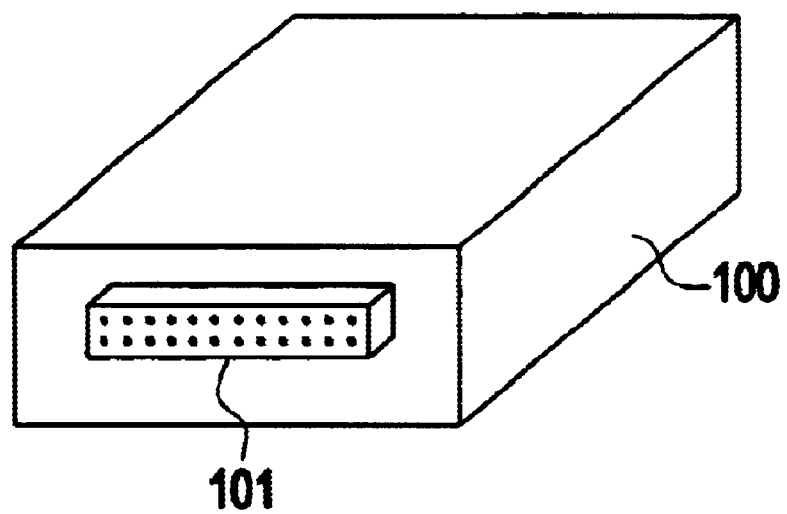

Discussion of the invention will now be made with specific references to the drawing figures. FIG. 1 illustrates a transferable core computer module 100. The module 100 is an interfaceless box which contains some of the essential elements of a computer such as CPU, RAM, and hard drive. On one end of the module is the universal interface port 101 comprising a plurality of pins which provides power to the core module 100 and permits communication between the core module 100 and the remaining computer elements located within the enclosure casing. The interface port 101 on the core unit may include one or more pins that connect with a matching receptacle or mating connector in the enclosure. This extra pin or connector will, at system boot, tell the core what type of device is attached. From this information the core computer will "know" what operating system to load and what operating frequency to set the microprocessor to.

Figure 2:
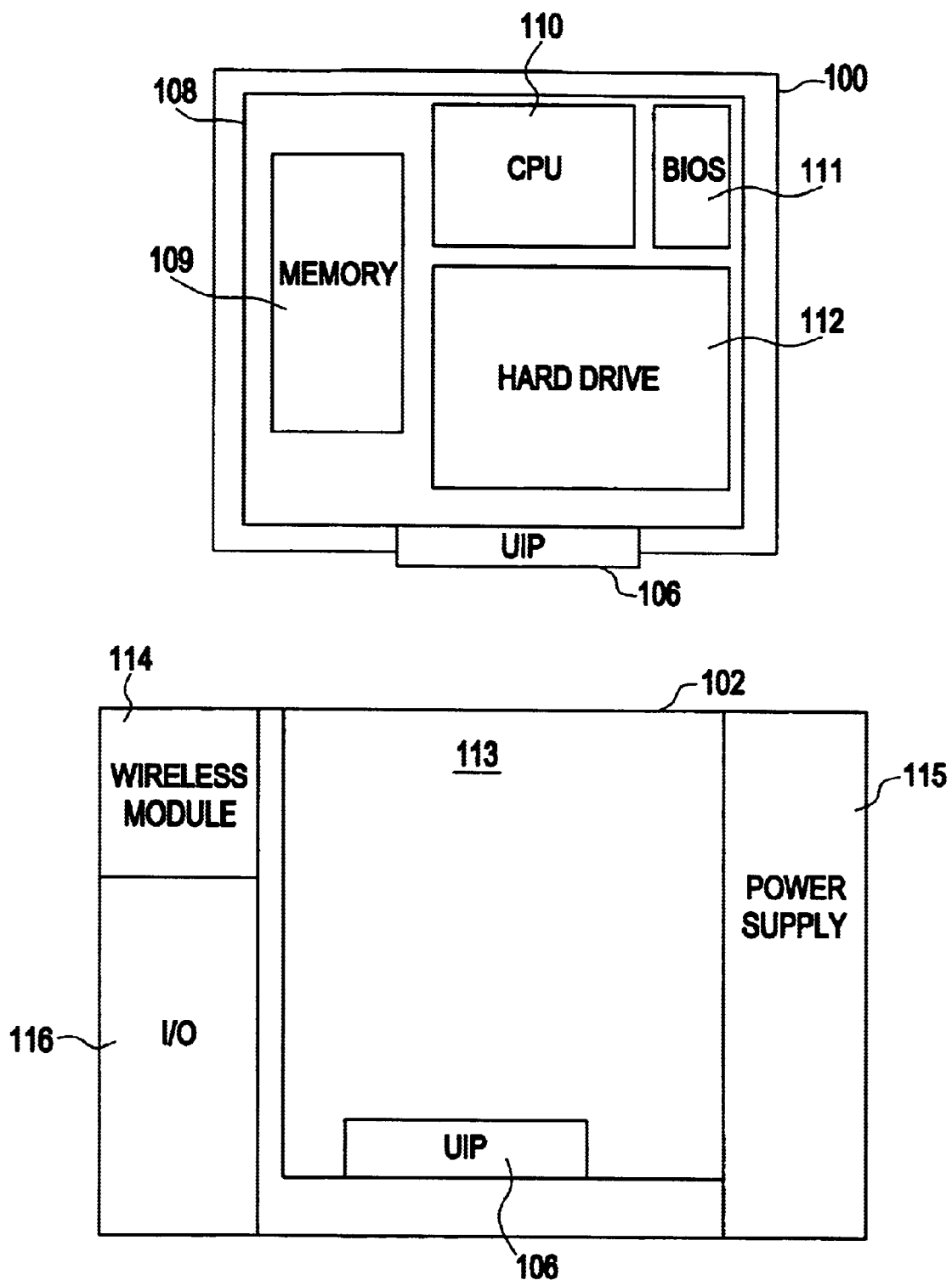
FIG. 2 illustrates an inner view of the internal components of the core computer and the enclosure of the present invention.

FIG. 2 illustrates an internal view of an exemplary core module 100 and enclosure 102 of the system of the present invention. The core module 100 contains a motherboard 108 comprised of a CPU 110, BIOS 111, hard drive 112, system memory 109 and a universal interface port 106. The port 106 supplies power to the core 100 and serves as the point of electrical interconnect between the enclosure 102 and the core 100. The enclosure 102 contains a complimentary universal interface port 106 at the bottom of the receiving bay 113. Also inside the enclosure is a power supply 115, I/O 116 and optionally a wireless module 114 to permit wireless communication by the enclosure 102. Wireless communication can include wireless modem, wireless network, Bluetooth, or other wireless protocol. Alternatively, the power supply 115 may be external to the enclosure case 102 or a secondary power supply may interface with the enclosure. This secondary power supply may include an AC power source or a DC power source.

Figure 3:
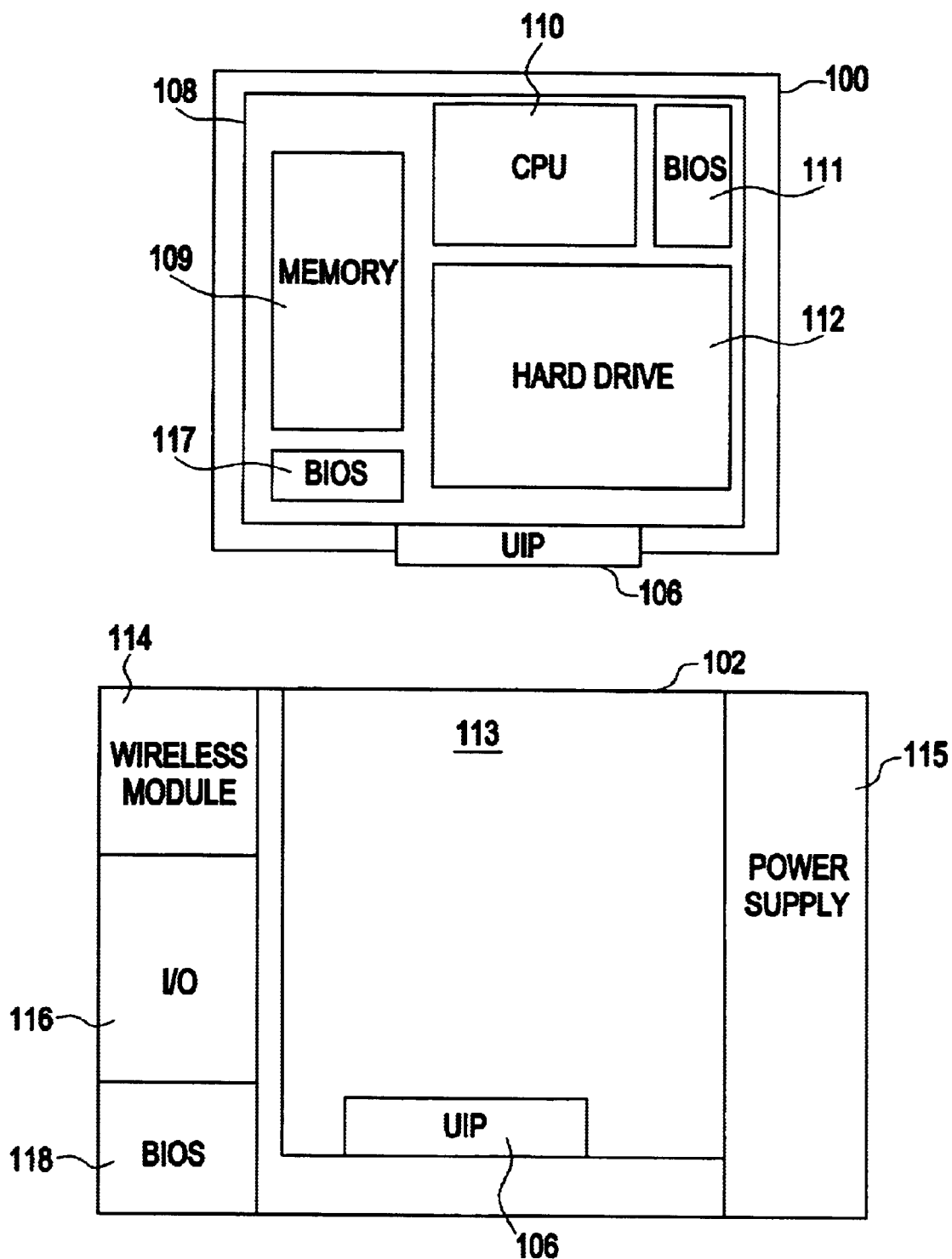
FIG. 3 illustrates an alternative embodiment of the internal components of the core computer and the enclosure of the present invention.

FIG. 3 illustrates an alternative embodiment of the core module and enclosure of the present invention. Either the core computer itself, or the enclosure will contain an BIOS chip 117 and 118, respectively, containing embedded code which either identifies or detects the nature of the enclosure so that the core computer will load the correct operating system and select the appropriate operating frequency for the microprocessor. Alternatively, in the core computer, BIOS chip 111 may be enabled to serve the function of BIOS chip 117.

One possessing ordinary skill in the art will appreciate that many other constructive embodiments can be imagined without departing from the spirit or scope of the disclosed invention.

We claim:

1. A computer system with clock down feature comprising, first and second computer structures, said first structure comprising a transferable core computer unit, said second structure comprising an enclosure and integral interface which when mated with and in electrical contact with said first structure creates a third functional computer structure or third structure, said first structure comprising substantially all the internal system components of a computer including a processor, volatile and non-volatile storage, main board, I/O controller, video controller and audio controller and wherein said second structure is one of a plurality of computer structure types each containing a particular user interface and physical proportions to receive said first structure, said first and second structures being non-functional as a computer when not mated with one another, said first structure being operative to determine the nature of the second structure to which it is mated and the application to be run by the third functional computer structure and adjusting the operating frequency of the microprocessor contained therein and loading the appropriate operating system from one or more operating systems from said first structure to perform the function of the third structure.

2. A computer system according to claim 1 wherein an electrical connector between said first and second structures is used to determine the nature of the second structure.

3. A computer system according to claim 2 wherein one or more pins on said connector are used to determine the nature of said second structure.

4. A computer system according to claim 1 wherein said first structure determines the nature of said second structure at the time that the third structure is switched into the powered on state.

5. A computer system according to claim 1 wherein a BIOS chip in said first structure causes the computer to execute computer code to determine the nature of the second structure.

6. A computer system according to claim 1 wherein the second structure transmits information to the first structure identifying its own nature.

7. A computer system according to claim 6 wherein said information is transmitted at the time that the third structure becomes powered on.

8. A computer system according to claim 1 wherein said clock down feature includes a manual override.

9. A computer system according to claim 1 further comprising a software application for defining a rule set for said clock down feature.

10. A computer system with clock down feature comprising, first computer structure and a second interface structure, means for combining said first and second structure to create a third functional structure, wherein said first structure comprising substantially all the internal system components of a computer including a processor, volatile and non-volatile storage, main board, I/O controller, video controller and audio controller and said second structure containing a user interface and physical proportions to receive said first structure, and wherein said second structure is one of a plurality of computer structure types each containing a particular user interface and physical proportions to receive said first structure, means for automatically determining the nature of the second structure, means for automatically adjusting the CPU clock of the first structure to control system performance of the third structure, and means for automatically loading an operating system from one or more operating systems from non-volatile memory contained in said first structure on the third functional structure.

11. A computer system according to claim 8 further comprising means in said first computer structure for detecting the nature of said second interface structure.

12. A computer system according to claim 8 further comprising means in said second computer structure for conveying information sufficient to characterize itself to said first computer structure.

13. A method of adjusting the operating frequency of a computer system comprising the steps of:

contacting a first core computer structure and a second interface enclosure structure to make a third operative computer device or third device, wherein said first structure comprising substantially all the internal system components of a computer including a processor, volatile and non-volatile storage, main board, I/O controller, video controller and audio controller and said second structure is one of a plurality of computer structure types containing a particular user interface and physical proportions to receive said first structure, sensing the nature of the enclosure when said third device is powered on, automatically adjusting the microprocessor operating frequency of said third device based upon said sensing, and automatically loading an appropriate operating system from one ore more operating systems from non-volatile memory in said first core computer structure for said third device based upon said sensing.

* * * * *